No. 760,753. PATENTED MAY 24, 1904.
C. H. PICKETT.
POT COVER.
APPLICATION FILED JULY 25, 1903.
NO MODEL.

Witnesses
C. H. Pickett.
Inventor
By
Attorneys

No. 760,753.

Patented May 24, 1904.

UNITED STATES PATENT OFFICE.

CHARLES H. PICKETT, OF EUGENE, OREGON.

POT-COVER.

SPECIFICATION forming part of Letters Patent No. 760,753, dated May 24, 1904.

Application filed July 25, 1903. Serial No. 167,040. (No model.)

*To all whom it may concern:*

Be it known that I, CHARLES H. PICKETT, a citizen of the United States, residing at Eugene, in the county of Lane and State of Oregon, have invented a new and useful Pot-Cover, of which the following is a specification.

This invention is an improved construction of pot-cover, the object being to provide a cover which can be quickly and easily attached to a pot or kettle and which will remain firmly thereon.

Another object of the invention is to provide a strainer attachment in connection therewith by means of which the liquid contents of the pot or kettle can be drawn off when desired. Another advantage of the strainer attachment is that in case the pot or kettle boils violently when the cover is arranged as a solid cover the boiling can be checked and controlled by partially or completely opening the strainer attachment.

Another object of the invention is to provide a pot-cover having an opening through which water can be introduced when desired and through which small vegetables can be removed from the pot without removing the cover from the pot or kettle.

With these various objects in view the invention consists, essentially, in providing a circular cover with an opening adjacent its edge and in pivoting a slide to the top of the cover, said slide being perforated for one-half its length, providing suitable guides for the said slide and also suitable means for connecting and operating said slide.

The invention consists also in certain details of construction hereinafter fully described, and pointed out in the claims.

Figure 1:
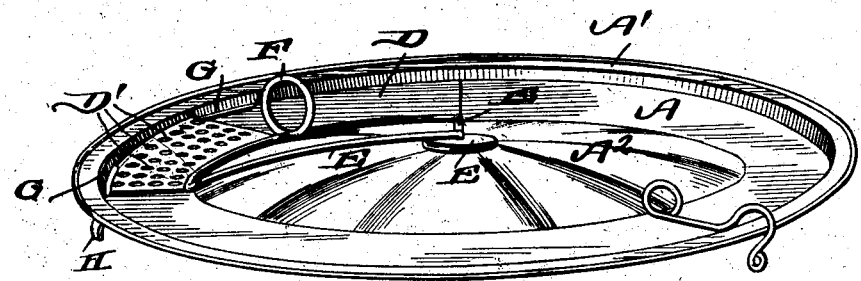
Figure 2:
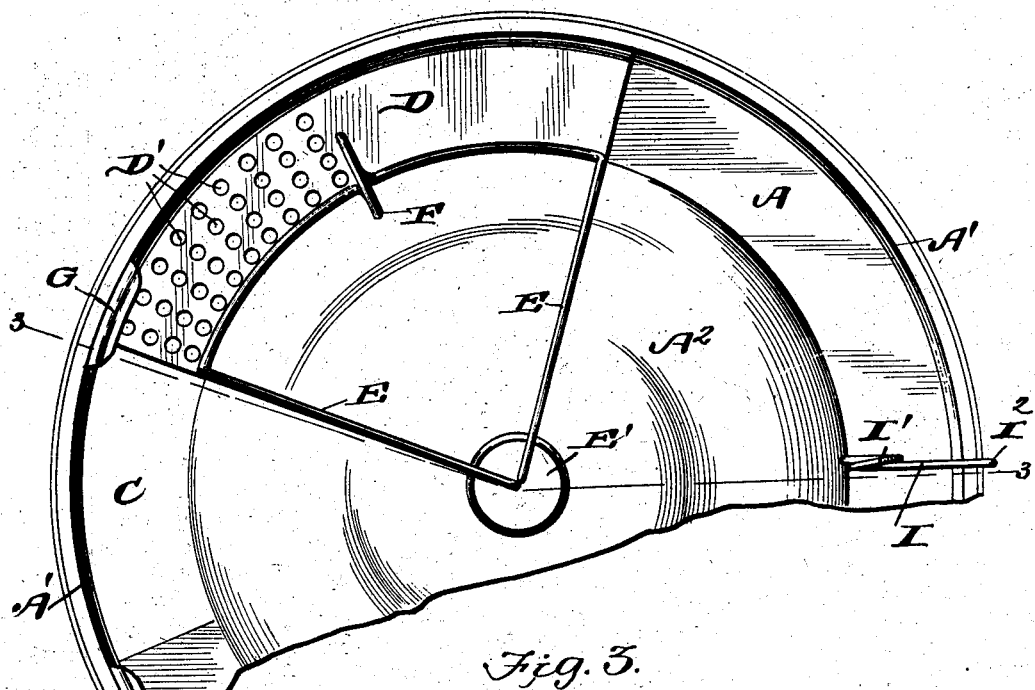
Figure 3:
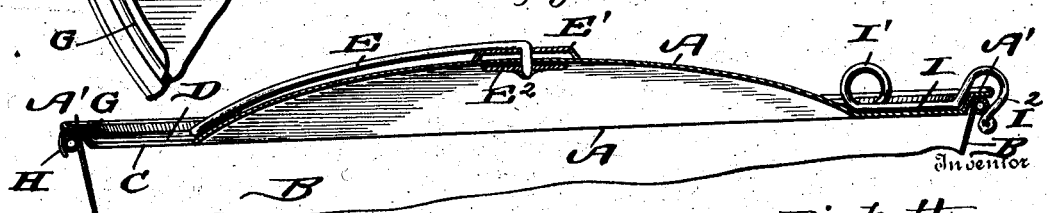

In the drawings forming part of this specification, Figure 1 is a perspective view of a pot-cover constructed in accordance with my invention. Fig. 2 is a top plan view showing a portion of the cover, and Fig. 3 is a vertical sectional view showing the manner of connecting the cover to the pot or kettle.

In carrying out my invention I employ a circular cover A, which is flanged around the outer edge, as shown at A', in order to snugly fit the top of the pot or kettle B. The central portion of the cover is slightly raised, as shown at $A^2$; but it will of course be understood that this is not at all necessary. A sector-shaped opening C is produced in the cover A adjacent one side, and sliding upon the said top so as to cover the opening C is a sector-shaped slide D, said slide being about twice as long as the sector-shaped opening C, and this slide has perforations D' produced therein for half its length, the other half being imperforate. This slide is pivotally connected to the top by means of wire arms E, which pass through a circular washer E' and through the center of the top and extend into a circular disk $E^2$, arranged upon the under side of the top. These wire arms E extend along the inner edge of the slide D and are soldered thereto, said arms being preferably formed from a single piece of wire and are bent into a ring or handle F adjacent the center of the slide D, so that the said slide can be quickly and easily moved across the opening C. Inwardly-projecting guide-lugs G are connected to the top and are adapted to overlap the outer edge of the slide, the purpose of said guide-lugs being to hold the slide in its proper position upon the face of the top.

In order to fasten the top to the pot or kettle, I provide said pot-cover with curved lugs H, which lugs are arranged adjacent each other along one side of the top, and at a point substantially diametrically opposite I provide a spring-wire hook I, which is attached to the upper face of the top, comprises a coil I' and a downwardly-extending hooked portion $I^2$, which is adapted to engage the top of the pot or kettle, the curved lugs H being hooked upon the top of the pot or kettle first and the spring-hook I then brought into engagement with the opposite edge of the pot or kettle, thus securely fastening the top thereto. When the top is so secured, the liquids in the pot or kettle can be drained therefrom by arranging the perforated portion of the slide over the opening C and tilting the kettle.

The cover can be converted into a solid cover by moving the imperforate portion of the slide over the opening C, and if the contents should boil too violently such violent boiling can be checked by moving the slide to one side or the other, so as to bring the perforated portion of the slide over the opening or completely uncover the opening.

When the opening is completely uncovered, water can be introduced into the kettle without removing the cover or small vegetables can be removed from the pot or kettle.

When it is desired to remove the cover from the pot or kettle, the spring-hook is easily forced out of engagement with the top of the pot or kettle, and the cover can then be quickly and easily removed.

It will thus be seen that I provide a simple and efficient construction of cover for pots or kettles which will effectively carry out all of the objects hereinbefore mentioned.

Having thus fully described my invention, what I claim as new, and desire to secure by Letters Patent, is—

1. A pot-cover having an opening adjacent one side, a slide pivoted to said cover and adapted to be moved over the said opening, a portion of said slide being perforated, the lugs attached to the cover at one side, and the spring-hook connected to the cover at the opposite side, substantially as described.

2. A pot-cover having an opening adjacent one side, a slide adapted to move over said opening, a portion of said slide being perforated, the wire arms connected to said slide and passing centrally through the cover, said wire arms being formed of a single piece of wire and shaped into a handle at the central portion of the slide, the guiding-lugs, the curved lugs, and the spring-wire hook connected to the cover, all arranged and adapted to operate substantially as described.

CHAS. H. PICKETT.

Witnesses:
GEO. B. DORRIS,
DWIGHT CARD.